United States Patent
Collins et al.

(10) Patent No.: US 11,127,987 B2
(45) Date of Patent: Sep. 21, 2021

(54) EVAPORATED ION CONDUCTIVE LAYER FOR DECREASED INTERFACIAL RESISTANCE/IMPEDANCE AT SILICON BASED ELECTRODE INTERFACE

(71) Applicant: International Business Machines Corporation, Armonk, NY (US)

(72) Inventors: John Collins, Tarrytown, NY (US); Teodor K. Todorov, Yorktown Heights, NY (US); Ali Afzali-Ardakani, Ossining, NY (US); Joel P. de Souza, Putnam Valley, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/397,497

(22) Filed: Apr. 29, 2019

(65) Prior Publication Data
US 2020/0343597 A1    Oct. 29, 2020

(51) Int. Cl.
*H01M 10/52* (2006.01)
*H01M 10/0565* (2010.01)
(Continued)

(52) U.S. Cl.
CPC ....... *H01M 10/4235* (2013.01); *H01M 4/131* (2013.01); *H01M 4/134* (2013.01); *H01M 10/058* (2013.01); *H01M 10/0565* (2013.01)

(58) Field of Classification Search
None
See application file for complete search history.

(56) References Cited

U.S. PATENT DOCUMENTS 6,042,969 A  *  3/2000  Yamada ............... H01M 4/134
                                                           429/218.1
7,070,632 B1 *  7/2006  Visco .................. H01M 4/366
                                                              29/623.3
(Continued)

FOREIGN PATENT DOCUMENTS

WO       2017116599 A2      7/2017

OTHER PUBLICATIONS

Pearse, A. J., et al., "Three-Dimensional Solid-State Lithium-Ion Batteries Fabricated via Conformal Vapor-Phase Chemistry", ACS nano 12.5, Publication Date Apr. 24, 2018, pp. 4286-4294.

(Continued)

*Primary Examiner* — Lisa S Park
(74) *Attorney, Agent, or Firm* — Scully, Scott, Murphy & Presser, P.C.; Daniel P. Morris, Esq.

(57) ABSTRACT

An interfacial additive layer for decreasing the interfacial resistance/impedance of a silicon based electrode-containing device such as, for example, an energy storage device or a micro-resistor, is disclosed. The interfacial additive, which is composed of evaporated lithium fluoride, is formed between a silicon based electrode and a solid polymer electrolyte layer of the device. The evaporated lithium fluoride serves as ion conductive layer. The presence of such an interfacial additive layer increases the ion and electron mobile dependent performances at the silicon based electrode interface due to significant decrease in the resistance/impedance that is observed at the respective interface as well as the impedance observed in the bulk of the device.

20 Claims, 4 Drawing Sheets

(51) Int. Cl.
*H01M 10/058* (2010.01)
*H01M 4/134* (2010.01)
*H01M 4/131* (2010.01)
*H01M 10/42* (2006.01)

(56) References Cited

U.S. PATENT DOCUMENTS

2012/0135314 A1* 5/2012 Shim ................. H01M 10/0569
 429/331
2014/0170503 A1* 6/2014 Yushin .............. H01M 10/0525
 429/306
2017/0179466 A1* 6/2017 Tiwari ................. B23K 26/244
2017/0338522 A1 11/2017 Hu et al.
2017/0365854 A1* 12/2017 Gopalakrishnannair ....................
 H01M 4/134
2018/0316043 A1* 11/2018 Jung ..................... H01M 4/382
2019/0020059 A1 1/2019 Choi et al.

OTHER PUBLICATIONS

U.S. Appl. No. 16/026,461, filed Jul. 3, 2018, entitled: Battery Structure With an Anode Structure Containing a Porous Region and Method of Operation, 51 pages, First Named Inventor: Joel P. de Souza.

* cited by examiner (Of the invention)

(Not of the invention)

EVAPORATED ION CONDUCTIVE LAYER FOR DECREASED INTERFACIAL RESISTANCE/IMPEDANCE AT SILICON BASED ELECTRODE INTERFACE

BACKGROUND

The present application relates to devices containing a silicon based electrode, and more particularly to energy storage devices containing a silicon based electrode and having a decreased interfacial resistance/impedance.

The integration of energy storage devices in microprocessors and memory chips is a significant requirement for IoT (internet of things) device applications. Typically, these devices require relatively high energy and power density from miniaturized storage devices embedded in CMOS circuits. Over the next generation, required energy consumption for electronic devices will decrease as human controlled and autonomous devices will increasingly become miniaturized. Power consumption is expected to be well below 1 Watt for these devices.

Emerging applications requiring these on-board generation storage devices include IoT applications, mobile devices, sensory equipment, and autonomous environmental, biological and social functional machines. Common examples of such functional devices are known as smart dust and/or biomedical sensory/drug delivery.

Additionally, all solid-state energy storage devices will progressively integrate a lithium metal electrode material into its overall cell structure due to lithium metal's extremely high theoretical energy density (3860 mAh/g) and therefore its' ability to maintain high capacity throughout the cell's lifetime. A feasible process forming an interfacial-modified silicon based electrode material as a stable nucleation site for the in-situ formation of lithium metal electrodes is disclosed, for example, in U.S. Ser. No. 16/026,461 entitled "Battery Structure with an Anode Structure Containing a Porous Region and Method of Operation", filed on Jul. 3, 2018.

One enormous impediment to making the above need a reality are the methods by which the active and inactive energy storage device components are integrated together—specifically, how these methods affect the cross-linking and adhesion between interfaces which facilitate ion/electron-charge transfer throughout the electrochemical components of the cell. The physical and chemical conditions of how electrochemically active energy storage components are synthesized as well as 'bonded' or 'cross-linked' together determines their performance capabilities within a fully capable and effective energy storage device—especially with regard to the amount of impedance charge particles endure during transport across energy storage device interfaces.

One method to achieve high performing energy storage device components is to administer the synthesis and bonding of energy storage device components during component layer integration (prior to full cell assembly or electrochemical cycling). As the physical and chemical conditions of each component layer is altered, especially in regards to the solid/semi-solid electrolyte, the inter-layer bonding capabilities as well as charge-conductive properties of the respective component layer can be utilized and optimized, respectively, to create a highly material-dependent and efficient solid state/semi-solid state energy storage device that is well bonded to other energy storage device components and therefore illustrates very low interfacial-induced charge-blocking resistance. As such, the independent treatment of each component layer within an electrically and ionically insulated energy storage housing unit can facilitate the fabrication of highly efficient working energy storage devices.

SUMMARY

An interfacial additive layer for decreasing the interfacial resistance/impedance of a silicon based electrode-containing device such as, for example, an energy storage device or a micro-resistor, is disclosed. The interfacial additive, which is composed of evaporated lithium fluoride, is formed between a silicon based electrode and a solid polymer electrolyte layer of the device. The evaporated lithium fluoride serves as ion conductive layer. The presence of such an interfacial additive layer increases the ion and electron mobile dependent performances at the silicon based electrode interface due to significant decrease in the resistance/impedance that is observed at the respective interface as well as the impedance observed in the bulk of the device.

In one aspect of the present application, a device having a decreased interfacial resistance is provided. In one embodiment, the device includes a silicon based electrode. The device further includes an interfacial additive layer composed of evaporated lithium fluoride (i.e., a layer of LiF). The interfacial additive layer has a first surface that forms an interface with a surface of the silicon based electrode. The device even further includes a solid polymer electrolyte layer that forms an interface with a second surface of the interfacial additive layer that is opposite the first surface of the interfacial additive layer.

In some embodiments, the device may further include a second interfacial additive layer composed of evaporated lithium fluoride forming an interface with the solid polymer electrolyte layer, and a second silicon based electrode forming an interface with the second interfacial additive layer.

In one exemplary embodiment, the device includes a silicon based electrode composed of boron doped crystalline silicon, an interfacial additive layer composed of evaporated lithium fluoride, wherein the interfacial additive layer has a first surface forming an interface with a surface of the silicon based electrode, and a solid polymer electrolyte layer composed of a mixture of polycaprolactone, succinonitrile and lithium bis(trifluoromethanesulfonyl)imide (LiTFSI) forming an interface with a second surface of the interfacial additive layer that is opposite the first surface of the interfacial additive layer.

In some embodiments, such a device may further include a second interfacial additive layer composed of evaporated lithium fluoride forming an interface with the solid polymer electrolyte layer, and a second silicon based electrode composed of boron doped crystalline silicon forming an interface with the second interfacial additive layer.

In another aspect of the present application, a method of forming a device is provided. In one embodiment of the present application, the method includes depositing by evaporation lithium fluoride on a surface of a silicon based electrode to provide an interfacial additive layer composed of evaporated lithium fluoride. A solid polymer electrolyte layer is then formed on the interfacial additive layer.

DETAILED DESCRIPTION

Figure 1:
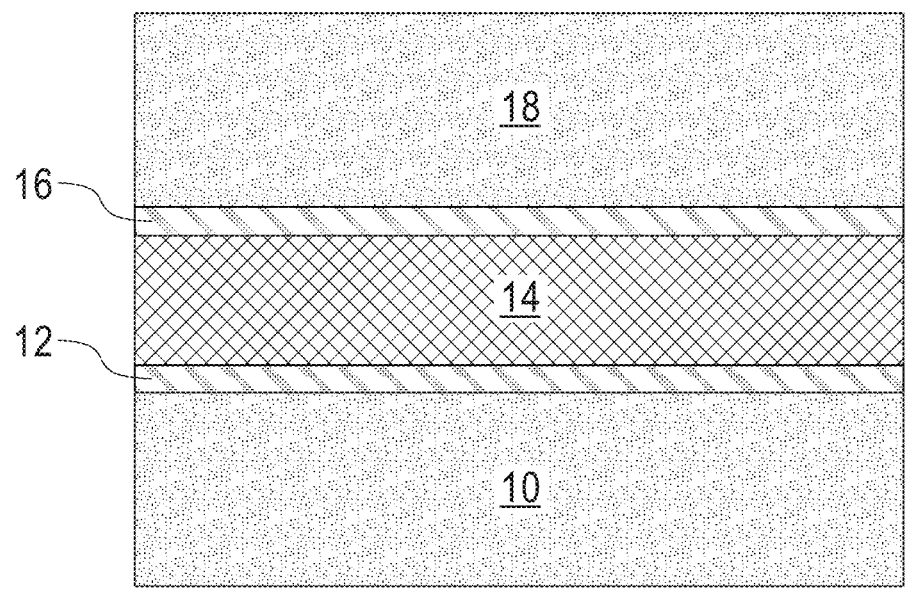
FIG. 1 is a cross sectional view of an exemplary device in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The present application provides devices including energy storage devices and micro-resistors that contain an interfacial additive layer composed of evaporated lithium fluoride between the silicon based electrode and a solid polymer electrolyte layer. The presence of such an interfacial additive between the silicon based electrode and the solid polymer electrolyte layer decreases the interfacial impedance of the device compared to a like device in which the interfacial additive layer is omitted. The presence of the evaporated lithium fluoride interfacial additive layer increases the ion and electron mobile dependent performances at the silicon based electrode interface due to a significant decrease in the resistance/impedance that is observed at the respective interface as well as the impedance observed in the bulk of the device.

Reference is now made to FIG. 1, which illustrates an exemplary device in accordance with an embodiment of the present application. The exemplary device includes a silicon based electrode 10, an interfacial additive layer 12 composed of evaporated lithium fluoride. The interfacial additive layer 12 has a first surface that forms an interface with a surface of the silicon based electrode 10. The device even further includes a solid polymer electrolyte layer 14 that forms an interface with a second surface of the interfacial additive layer 12 that is opposite the first surface of the interfacial additive layer 12. In some embodiments, the device may further include a counter electrode 18 located above the solid polymer electrolyte 14. In some embodiments, a second interfacial additive layer 16 can be formed between the counter electrode 18 and the solid polymer electrolyte layer 14. In some embodiments, the second interfacial additive layer 16 is omitted. When present, the second interfacial layer 16 has a first surface that forms an interface with solid polymer electrolyte layer 14, and a second surface that forms an interface with the counter electrode 18.

Figure 2:
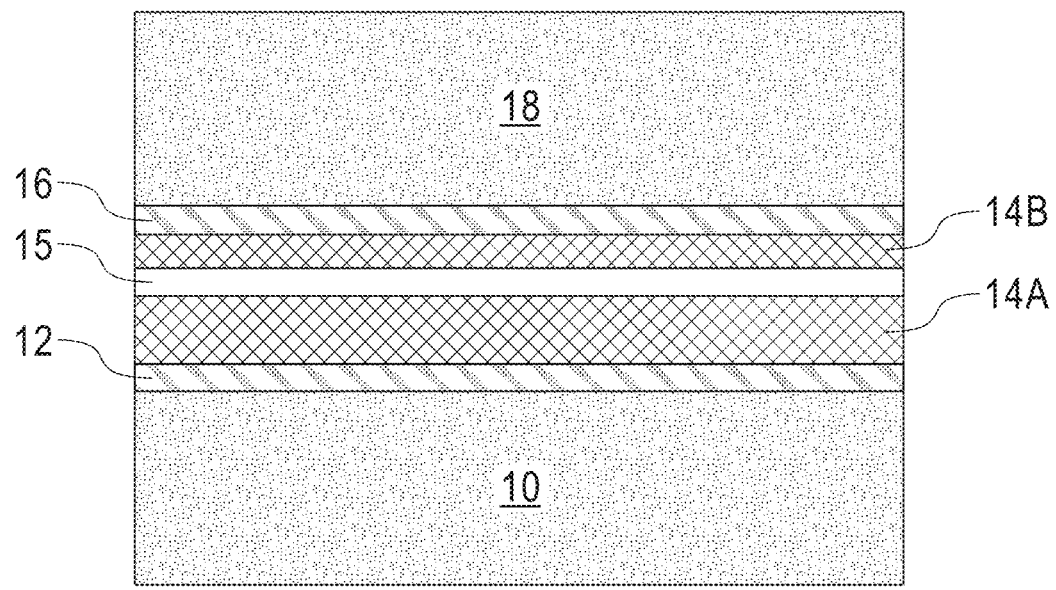
FIG. 2 is a cross sectional view of another exemplary device in accordance with another embodiment of the present application.

FIG. 2 illustrates another exemplary device in accordance with the present application which is identical to the device shown in FIG. 1 except that a separator (or dielectric region) 15 is located between a lower region 14A of the solid polymer electrolyte layer and an upper region 14B of the solid polymer electrolyte layer.

Although not shown in FIGS. 1 and 2, the silicon based electrode 10 is typically present on a surface of a base substrate. If present, the base substrate may include any conventional material that is used as an electrically conductive substrate for an energy storage device. Examples of such a substrate may include but are not limited to copper, aluminum, nickel, titanium or respective alloys thereof. The substrate may be mechanically or chemically attached, adhered or bonded with the silicon based electrode. In one embodiment, the base substrate may include a semiconductor material and/or any other material having semiconductor properties. In one embodiment, the base substrate is a bulk semiconductor substrate. By "bulk" it is meant that the base substrate is entirely composed of at least one semiconductor material. In one example, the base substrate may be entirely composed of silicon which may be single crystalline. In some embodiments, the bulk semiconductor substrate may include a multilayered semiconductor material stack including at least two different semiconductor materials. In one example, the multilayered semiconductor material stack may comprise, in any order, a stack of Si and a silicon germanium alloy. In another embodiment, the multilayered semiconductor material may comprise, in any order, a stack of Si and single or multiple silicon-based alloys, such as silicon-germanium or carbon-doped silicon-based alloys.

In some embodiments, the base substrate may have a non-textured (flat or planar) surface. The term "non-textured surface" denotes a surface that is smooth and has a surface roughness on the order of less than 100 nm root mean square as measured by profilometry or Atomic Force Microscopy. In yet another embodiment, the base substrate may have a textured surface. In such an embodiment, the surface roughness of the textured substrate can be in a range from 100 nm root mean square to 100 μm root mean square as also measured by profilometry or Atomic Force Microscopy. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the base substrate is composed of a plurality of high surface area 3-dimensional features. In some embodiments, a plurality of metallic masks are used, which may be formed by depositing a layer of a metallic material and then performing an anneal. During the anneal, the layer of metallic material melts and balls-ups such that de-wetting of the surface of the base substrate occurs.

In some embodiments (not shown), a current collector is formed contacting a bottommost surface of silicon based electrode 10. This current collector may be referred to as a first current collector. The first current collector may include any conductive metal or conductive metal nitride such as, for example, titanium (Ti), platinum (Pt), nickel (Ni), aluminum (Al) or titanium nitride (TiN). The current collector may include a single layer of a conductive metal or conductive metal nitride, or a material stack including at least two different conductive metals and/or conductive metal nitrides. In one example, the first current collector can include a stack of, from bottom to top, titanium (Ti), platinum (Pt) and titanium (Ti). The first current collector can be formed utilizing deposition techniques well known to those skilled in the art.

The silicon based electrode 10 has a first polarity, while the counter electrode 18 has a second polarity that is opposite from the first polarity. In some embodiments of the present application, the silicon based electrode 10 may be an anode electrode, while the counter electrode 18 is a cathode electrode. In other embodiments of the present application, the silicon based electrode 10 may be a cathode electrode, while the counter electrode 18 is an anode electrode.

In accordance with the present application, the silicon based electrode 10 is composed of a silicon-containing material. The term "silicon-containing material" is used throughout the present application to denote a material that includes at least silicon and has semiconductor material properties. Examples of silicon-containing materials that made can be employed as the silicon based electrode 10 include silicon (Si), a silicon germanium alloy, or a carbon-doped silicon based alloy. Typically, the silicon based electrode 10 is composed entirely of silicon (Si).

The silicon-containing materials that provide the silicon based electrode 10 can be non-crystalline semiconductor materials or crystalline semiconductor materials. The silicon based electrode 10 may be entirely non-porous, entirely porous or contain some regions that are non-porous and other regions that are porous. The silicon containing materials may be non-doped, doped or contain some regions that are doped and other regions that are non-doped. The dopant can be a p-type dopant or an n-type dopant.

The term "p-type" refers to the addition of impurities to an intrinsic semiconductor that creates deficiencies of valence electrons. In a silicon-containing semiconductor material, examples of p-type dopants, i.e., impurities, include, but are not limited to, boron, aluminum, gallium and indium. The concentration of p-type dopant within the silicon-containing material that provides silicon based electrode 10 can range from 1E16 atoms/cm$^3$ to 3E20 atoms/cm$^3$.

The term "n-type" refers to the addition of impurities that contributes free electrons to an intrinsic semiconductor. In a silicon containing semiconductor material, examples of n-type dopants, i.e., impurities, include, but are not limited to, antimony, arsenic and phosphorous. The concentration of n-type dopant within the silicon-containing material that provides silicon based electrode 10 can range from 1E16 atoms/cm$^3$ to 1E21 atoms/cm$^3$.

Illustrative examples of silicon-containing materials that can used as the silicon based electrode 10 include non-porous silicon, partially porous crystalline silicon, single-crystal non-porous silicon, crystalline silicon, a low resistance doped crystalline silicon (to be defined herein below), boron doped crystalline silicon or boron doped crystalline porous silicon. In one embodiment, boron doped crystalline silicon having a boron dopant concentration of from 1E19 atoms/cm$^3$ to 3E20 atoms/cm$^3$ is used as the silicon-containing material that provides the silicon based electrode 10.

The term "low resistance doped crystalline silicon" denotes a silicon based electrode 10 that is of unitary construction (i.e., a monolith structure) and includes a non-porous region and a porous region, as defined in U.S. Ser. No. 16/026,461 entitled "Battery Structure with an Anode Structure Containing a Porous Region and Method of Operation", filed on Jul. 3, 2018, the entire content and disclosure of which is incorporated herein by reference.

The porous region comprises a top porous layer (Porous Region 1) having a first thickness and a first porosity, and a bottom porous layer (Porous Region 2) having a second porosity that is greater than the first porosity and a second thickness that is greater than the first thickness. The bottom porous layer (i.e., Porous Region 2) is located beneath the top porous layer (i.e., Porous Region 1) and forms an interface with the non-porous region. Also, at least an upper portion of the non-porous region and the entirety of the porous region are composed of silicon. In one embodiment, the second porosity has an average pore opening of greater than 3 nm, and the second thickness is between 0.1 μm to 20 μm, while the first porosity has an average pore opening of less than 3 nm, and the first thickness is 50 nm or less.

As mentioned above, Porous Region 1, Porous Region 2 and the non-porous region are of unitary construction. Thus, non-porous region and porous Regions 1 and 2 are electrically, chemically and mechanically part of a same electrode structure. In some embodiments, the Porous Region 1, Porous Region 2 and the non-porous region are entirely composed of silicon. In one example, the electrode base structure 10 including the non-porous region and porous Regions 1 and 2 has a three-dimensional (3D) lattice framework composed of a p-type crystalline silicon material.

The low resistance doped crystalline silicon that can be used as the silicon electrode base 10 can be made using an anodization process in which a substrate including at least an upper region of a p-type silicon material is immersed into a solution of concentrated HF (49%) while an electrical current is applied with platinum as the anode and the substrate as the cathode. The anodization process is performed utilizing a constant current source that operates at a current density from 0.05 mA/cm$^2$ to 150 mA/cm$^2$, wherein mA is milli-Amperes. In some examples, the current density is 1 mA/cm$^2$, 2 mA/cm$^2$, 5 mA/cm$^2$, 50 mA/cm$^2$, or 100 mA/cm$^2$. In a preferred embodiment, the current density is from 1 mA/cm$^2$ to 10 mA/cm$^2$. The current density may be applied for 1 second to 5 hrs. In some examples, the current density may be applied for 5 seconds, 30 seconds, 20 minutes, 1 hour, of 3 hours. In an embodiment, the current density may be applied for 10 seconds to 1200 seconds, specifically for the doping level in the range $10^{19}$ cm$^3$ range. The anodization process is typically performed at nominal room temperature from (20° C.) to 30° C.) or at a temperature that is slightly elevated from room temperature. Following the anodization process, the structure is typically rinsed with deionized water and then dried.

The interfacial additive layer 12 composed of evaporated lithium fluoride is then formed on a surface of the silicon based electrode 10 such that a first surface of the interfacial additive layer 12 forms an interface with a surface of the silicon based electrode 10. The interfacial additive layer 12 composed of evaporated lithium fluoride is an amorphous lithium fluoride layer that is present on the silicon based electrode 10.

The interfacial additive layer 12 can be formed by depositing, by evaporation, a layer of lithium fluoride on a surface of the silicon based electrode 10. The evaporation includes providing a source material lithium fluoride. The source material is then evaporated in a vacuum. The vacuum allows vapor particles of the lithium fluoride to travel to the silicon based electrode 10, where the vapor particles condense back to a solid state. The evaporation includes an evaporation apparatus that contains at least a vacuum pump and an energy source that evaporates the source material, i.e., lithium fluoride to be deposited. The evaporation process may include, but is not limited to, e-beam evaporation, thermal evaporation using Ni, Ta, Mo or W boat or RF sputtering. The pressure during deposition is typically controlled from 10E-8 to 10E-4 Torr and the temperature from 875° C. to 1180° C. The thickness of the interfacial additive layer can be controlled either through pre-measuring the mass of the evaporated material or through quartz microbalance rate monitor. As a non-limiting example LiF from 3.5 to 6.5 mg can be placed into a tungsten boat and fully evaporated under a vacuum of less than $2 \times 10^{-5}$ bar by applying current from 20 Amps to 50 Amps which heats the boat to over 1100° C. The interfacial additive layer 12 can have a thickness from 1 nm to 50 nm. Other thicknesses can be used as the thickness of the interfacial additive layer 12.

In typical experiments, crystalline boron doped (at above defined concentrations) silicon discs ⅝" in diameter were etched in 4 to 10% hydrofluoric acid between 25 to 60 seconds to remove native oxide layers. These discs were then immediately mounted to a steel plate and vacuum sealed as the target object in an evaporation system located inside a nitrogen environment glove box. A layer of lithium fluoride was thermally evaporated from a resistively heated tungsten boat. A premeasured amount of LiF form 3.5 to 6.5 mg was placed into the boat and fully evaporated under a vacuum of less than $2 \times 10^{-5}$ bar by applying current from 20 Amps to 50 Amps, material was then weighed out and deposited into a conductive powder sample holder, which is attached to the user controlled power source of the evaporation system.

The solid polymer electrolyte layer 14 is then formed on a second surface of the interfacial additive layer 12 that is opposite the first surface of the interfacial additive layer 12 that forms an interface with the silicon based electrode 10. In the embodiment shown in FIG. 1, the solid polymer electrolyte layer 14 is continuous from a bottommost surface to a topmost surface.

The solid polymer electrolyte layer 14 that can be used in the present application is any solid polymer material that can conduct Li ions. In one embodiment, the solid polymer electrolyte layer 14 is composed of a mixture of a polymer structure host material, a Li-conductive/plasticizing material and a lithium containing salt. In such an embodiment, the mixture includes from 35 weight percent to 50 weight percent of the polymer structure host material, from 15 weight percent to 25 weight percent of the conductive/plasticizing material, and from 30 weight percent to 45 weight percent of the lithium containing salt, where the polymer host material and conductive/plasticizing material are dissolved into anhydrous acetonitrile with a solid:solvent ratio between 1:2 to 1:10, with a preferred ratio of 1:3. The mixture can be made utilizing techniques well known to those skilled in the art.

Illustrative examples of polymer structure host materials include at least one of poly(ethylene oxide) (PEO), poly (propylene oxide) (PPO), poly(dimethylsiloxane), poly(vinyl chloride), or polycaprolactone. Illustrative examples of Li-conductive/plasticizing material include at least one of succinonitrile, poly(ethylene glycol) (PEG), an aprotic organic solvent, or dimethylsulfoxide (DMSO). Illustrative lithium containing salts that can be used in forming the solid polymer electrolyte layer include, but are not limited to, lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB). In one embodiment, the lithium containing salt that is present in the solid polymer electrolyte layer 14 is LiTFSI.

In the embodiment illustrated in FIG. 2, the solid polymer electrolyte layer has a lower region 14A and an upper region 14B, and a separator (or dielectric region) 15 is present between the lower region and the upper region. The separator 15 can be composed of at least one of polyacrylnitrile (PAN), polyethylene oxide (PEO) based copolymer matrices or structural membranes, a quarternized polysulfone membrane, electrospun polyvinylidene fluoride, or a methylmethacrylate (MMA)/polyethylene (PE) composite.

In some embodiment, the solid polymer electrolyte layer 14 is composed of a garnet/polymer electrolyte composite (e.g., $Li_{6.5}La_3Zr_{1.5}Ta_{0.5}O_{12}$/PEO composites) which acts as both a solid polymer electrolyte and separator in one.

The solid polymer electrolyte layer 14 may be formed utilizing a deposition process such as, drop casting, pipette casting, blade coating, spin coating, spray coating, etc. followed by controlled temperature and pressure conditions or plating. In one embodiment, the solid-state electrolyte is formed by sputtering utilizing any conventional target source material in conjunction with reactive or inert gasses. For example, sputtering may be performed in the presence of at least a nitrogen-containing ambient. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 50% to 100%, with a nitrogen content within the ambient from 99.9% to 100% being more typical.

As mentioned above, a second interfacial additive layer 16 can be formed on the solid polymer electrolyte layer 14. The second interfacial additive layer 16 may have a thickness from 1 nm to 50 nm. In some embodiments, the second interfacial additive layer 16 is omitted. When present, the second interfacial layer 16 has a first surface that forms an interface with solid polymer electrolyte layer 14, and a second surface that forms an interface with the counter electrode 18 to be subsequently formed.

In some embodiments (typically used when the counter electrode 18 is composed of a silicon-containing material as defined above for the silicon based electrode 10), the second interfacial additive layer 16 is composed of evaporated lithium fluoride. In the embodiments in which the second interfacial additive layer 16 is composed of evaporated lithium fluoride, the second interfacial additive layer 16 is formed utilizing the process mentioned above for forming the interfacial additive layer 12.

In some embodiments (typically used when the counter electrode 18 is composed of a cathode material or anode material as defined herein below), the second interfacial additive layer 16 is composed of an interfacial additive material such as, for example, a carbon (C) based material, gold (Au) or a dielectric material oxide such as, for example, aluminum oxide. The interfacial additive material that can provide the second interfacial additive layer 16 may be a mixture with any combination of electrically insulating as well as Li-ion ionic-conducting components, such as but not limited to $LiNbO_3$, $LiZrO_2$, $Li_4SiO_4$, or $Li_3PO_4$. The interfacial additive material that can provide the second interfacial additive layer 16 may be formed utilizing a deposition process including, for example, chemical vapor deposition, plasma enhanced chemical vapor deposition, evaporation, electrochemical plating, or atomic layer deposition.

The counter electrode 18 which is formed either on an exposed surface of the second interfacial additive layer 16 or exposed surface of the solid polymer electrolyte layer 14 (or upper region 14B) can be anode electrode or a cathode electrode. The counter electrode 18 is typically a lithium hosting electrode.

In embodiments in which the silicon based electrode 10 is an anode electrode, the counter electrode 18 is a cathode electrode. In such an embodiment, the cathode electrode (i.e., counter electrode 18) may include a second silicon based electrode. The second silicon based electrode may be compositionally the same as, or compositionally different from the silicon based electrode 10. The second silicon based electrode can include non-porous silicon, partially porous crystalline silicon, single-crystal non-porous silicon, crystalline silicon, a low resistance doped crystalline silicon, boron doped crystalline silicon or boron doped crystalline porous silicon.

In some embodiments, the cathode electrode (i.e., counter electrode 18) includes a lithium-containing cathode material. The lithium-containing cathode material may include a lithium-containing material such as, for example, a lithium-based mixed oxide. Examples of lithium-based mixed oxides that may be employed as the lithium-containing cathode material include, but are not limited to, lithium cobalt oxide ($LiCoO_2$), lithium nickel oxide ($LiNiO_2$), lithium manganese oxide ($LiMn_2O_4$), lithium manganese oxyfluoride ($Li_2MnO_2F$), lithium vanadium pentoxide ($LiV_2O_5$), lithium nickel manganese cobalt (NMC), nickel cobalt aluminum oxide (NCA), any combination of sulfur-based materials with lithium and other structure supporting elements such as iron, or lithium iron phosphate ($LiFePO_4$).

In some embodiments, a layer of the lithium-containing cathode material may be formed utilizing a deposition process such as, sputtering, slurry casting or electroplating. In one embodiment, a layer of the lithium-containing cathode material is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof in conjunction with oxygen.

In some embodiments, the layer of lithium-containing cathode material may be formed by slurry casting, which may contain a mixture of electrochemically active [cathode materials, electron-conducting materials (e.g., carbon-based materials)] and inactive (binder materials) components. The thickness of such layers could range from 5 µm to 500 µm. These slurries may also have an electrolyte component in the mixture, along with a lithium based salt(s).

In embodiments in which the silicon based electrode 10 is a cathode electrode, the counter electrode 18 is an anode electrode. In such an embodiment, the anode electrode (i.e., counter electrode 18) may include a second silicon based electrode. The second silicon based electrode may be compositionally the same as, or compositionally different from the silicon based electrode 10. The second silicon based electrode can include non-porous silicon, partially porous crystalline silicon, single-crystal non-porous silicon, crystalline silicon, a low resistance doped crystalline silicon, and boron doped crystalline silicon.

In some embodiments, the anode electrode (i.e., counter electrode 18) includes a lithium ion generator material or lithium intercalation active material. Examples of materials that may be used as the anode electrode include, but are not limited to, lithium metal, a lithium-base alloy such as, for example, $Li_xSi$, pre-lithiated carbon based material, pre-lithiated silicon based material or a lithium-based mixed oxide such as, for example, lithium titanium oxide ($Li_2TiO_3$). The anode electrode can be formed utilizing deposition techniques that are well known to those skilled in the art. In some embodiments, the anode electrode can be formed by sputtering.

Although not shown, a current collector may be formed atop the counter electrode 18 shown in FIGS. 1 and 2. The current collector that is formed atop the counter electrode 18 may be referred to as a second current collector. The second current collector may include one of the conductive materials mentioned above for the first current collector. In some embodiments, the second current collector is composed of a compositionally same conductive material (i.e., metal or metal nitride) or conductive material stack as the first current collector. In other embodiments, the second current collector is composed of a compositionally different conductive material (i.e., metal or metal nitride) or conductive material stack than the first current collector. The second current collector can be formed utilizing techniques well known to those skilled in the art.

In the present application, the inventive device has an interfacial area between the silicon based electrode and the interfacial additive layer that can have a charge resistance of less than 43 ohms/$cm^2$, the interfacial area and bulk regions of the solid polymer electrolyte layer can have a mass transport resistance of less than 2895 ohms/$cm^2$, and wherein a mass transfer/charge transfer resistance ratio is less than, or equal to, 68. These values will become more apparent from the discussion provided herein below for FIGS. 4A and 4B of the present application.

Figure 3:
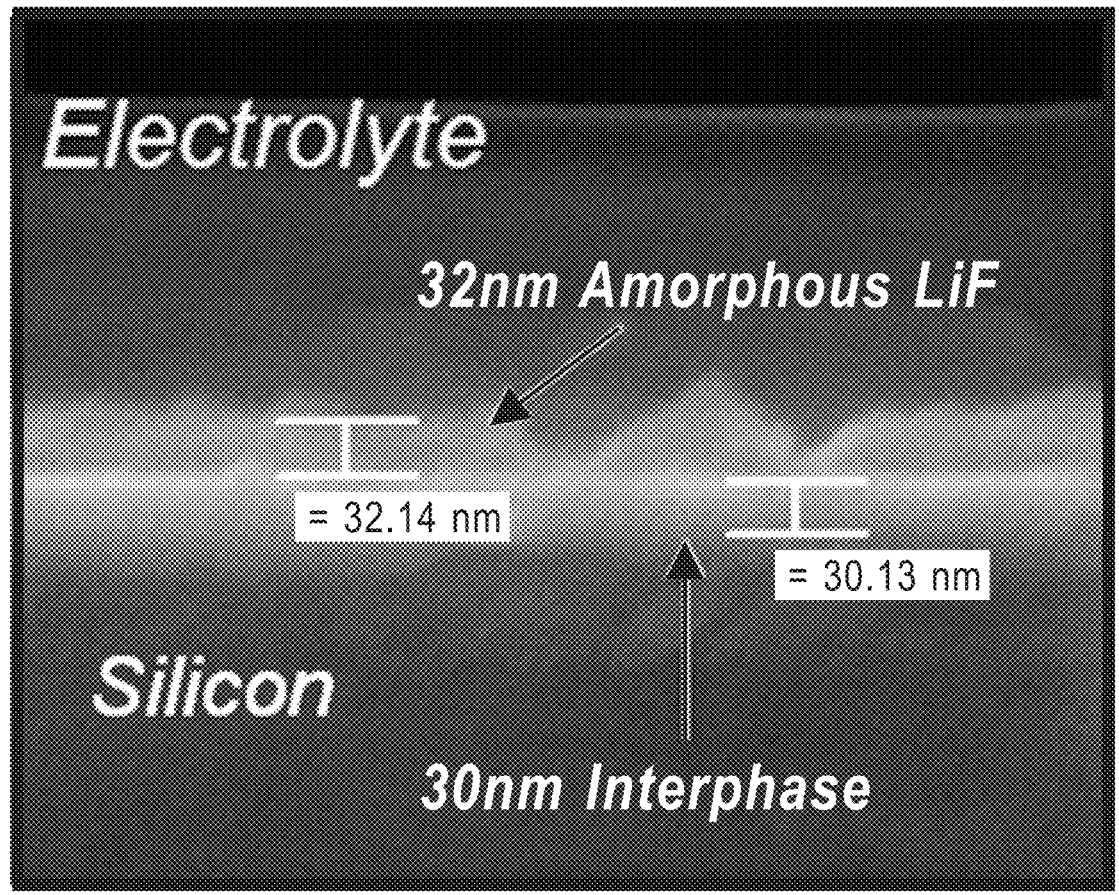
FIG. 3 is a scanning electron micrograph (SEM) of an exemplary device in accordance with the present application.

Reference is now made to FIG. 3, which is a cross sectional scanning electron micrograph (SEM) of an exemplary device in accordance with the present application. In this example, the silicon based electrode 10 was composed of boron doped crystalline silicon, the interfacial additive layer 12 was composed of evaporated lithium fluoride, and the solid polymer electrolyte layer 14 was composed of a mixture of polycaprolactone, succinonitrile and bis(trifluoromethanesulfonyl)imide (LiTFSI).

As is seen, an interphase region is located between the silicon based electrode 10 and the interfacial additive layer 12. The interphase region is a region that includes a mixed composition of the silicon based electrode 10 and the interfacial additive layer 12, i.e., a mixture of Si and LiF. The interphase region can form any time after cell assembly, during the operation of the cell or charging/discharging of the device.

As described in more detail below, the interfacial additive layer 12 of the present application has its' electrochemical impedance impact modeled by in-situ Electrochemical Impedance Spectroscopy (EIS) measurements which show a reduction in interfacial impedance between the silicon based electrode 10 and the solid polymer electrolyte (SPE) layer 14 when the inventive interfacial additive layer 12 is utilized.

In the following examples, a single symmetric cell (Cell 1) not in accordance with the present invention was compared to a single symmetric cell (Cell 2) in accordance with the present application. The single symmetric cell (Cell 1) that is not in accordance with the present application, corresponding with the FIGS. 5A and 5B, included a boron doped crystalline silicon electrode/a solid polymer electrolyte layer of polycaprolactone, succinonitrile and bis(trifluoromethanesulfonyl)imide (LiTFSI) containing a polyacrylonitrile (PAN)-based separator/another boron doped crystalline silicon electrode.

Figure 4A:
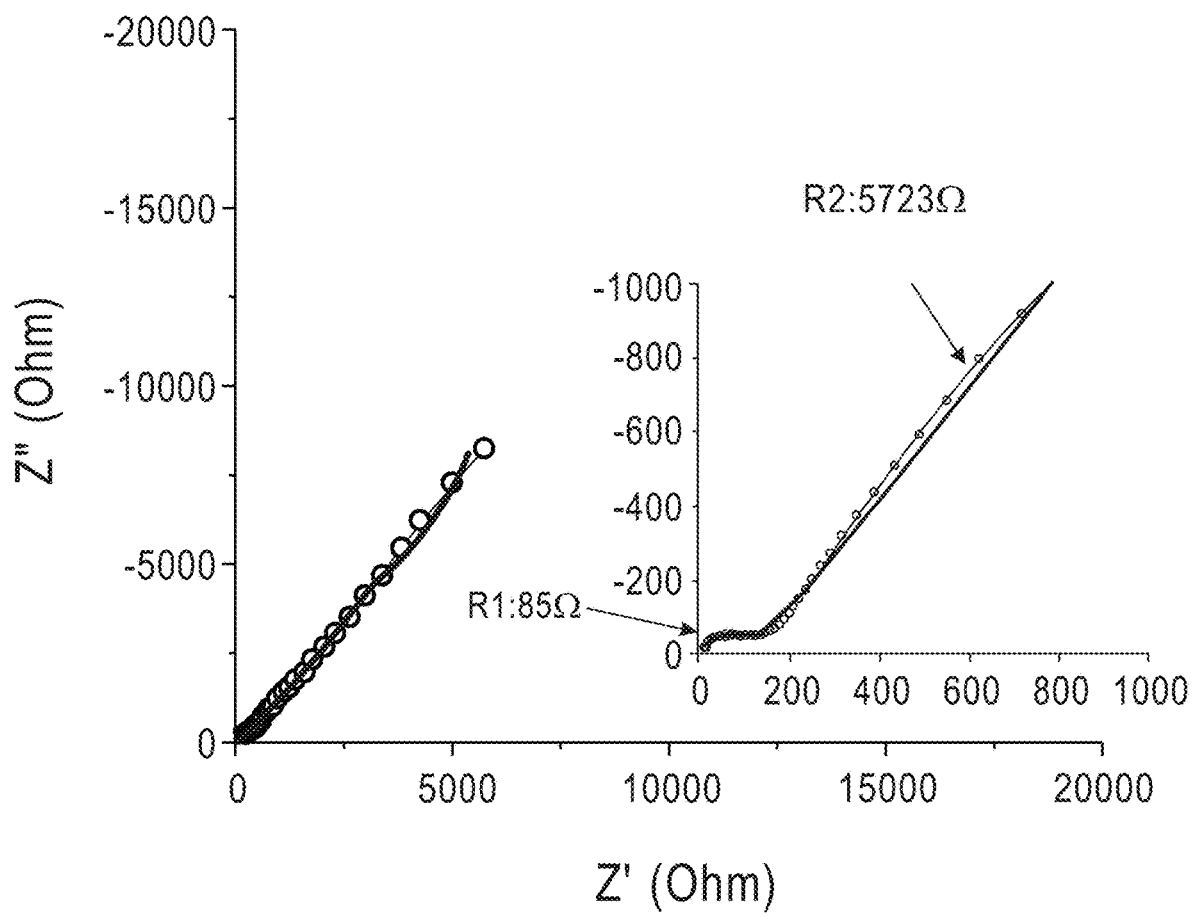
FIG. 4A is graph plotting real part of impedance, Z' in ohms (Ω) vs. imaginary part of impedance, Z" in ohms (Ω) for a device in accordance with the present application.
Figure 4B:
FIG. 4B is the resistor-capacitor model used to fit experimental data and obtain impedance values from the data shown in FIG. 4A.

The single symmetric cell (Cell 2) in accordance with the present application, corresponding to FIGS. 4A and 4B, includes a boron doped crystalline silicon electrode/an interfacial additive layer of evaporated lithium fluoride/a solid polymer electrolyte layer of polycaprolactone, succinonitrile and bis(trifluoromethanesulfonyl)imide (LiTFSI)/another interfacial additive layer of evaporated lithium fluoride/another boron doped crystalline silicon electrode.

A Nyquist plot is a graph used in Electrochemical Impedance Spectroscopy (EIS) that plots the real part of a battery impedance (associated with real cell resistance) on the X-axis and the imaginary part (associated with cell capacitance) of the battery impedance on the Y-axis over a range of frequencies, e.g., each data point (typically) on the Nyquist plot is one given frequency. The lower frequencies are on the right side of the graph (X-axis) and higher frequencies are on the left (of the X-axis) and the Y-axis shows negative values representing the imaginary part of the impedance.

Generally, in EIS analysis, $R_s$ is measured/estimated as the real part of the impedance at the higher or highest frequency data point of the Nyquist plot. $R_s$ is a pure resistive component denoted as ohmic or series type resistance, between the electrodes of the battery and can often be associated with contact resistance of the cell. Generally, resistor components refer to resistor like elements in the electrochemical model makeup of the cell; capacitor elements refer to an impedance component of the cell which has a phase change (towards −90 degrees) in its' AC current response with respect to frequency—an EIS element with a high degree of capacitance character (e.g., a "C" element) illustrates a surface often associated with unintimate contact (delaminated layers); constant phase elements (CPE) are elements in cell impedance which can maintain a constant phase of AC current response over a given frequency range (often associated with transition layers grown or established in-situ). Generally, in EIS analysis of cells with high performing ion diffusion, electrode/electrolyte interface ion transport processes and/or mass transport (electrolyte migration) associated with the electrolyte, the Warburg impedance measurement frequency component of the cell ($Ws_1$) is observed as a near 45 degree "straight, diagonal" section of the Nyquist plot.

The large Nyquist plot in FIG. 4A shows the impedance plots for Cell 2 described above. The "circle" points on each curve are actual measured values at a given frequency and the solid line is the calculated values from a best fit RC model, respectively. The smaller Nyquist plot included as an inset in FIG. 4A illustrates a magnified illustration of the high to mid frequency of the large Nyquist plot for Cell 2 described above.

FIG. 4B is a diagram of an RC model for Cell 2 described above. The model comprises a series or ohmic associated resistance, $R_s$; in series with a parallel combination of a resistor, R1 and capacitor element, C1, associated impedance; in series with a parallel combination of resistor, R2 and a constant phase element which is thought to represent the both the interface and composition of the solid polymer electrolyte; in series with a "Warburg impedance, $W_{s1}$.

The frequency measurements varied from 1 megahertz to 200 millihertz; utilizing a potential amplitude of 50 mV.

The parallel combination of a resistor, R1 and capacitor element (C1) is thought to be the electrical model of the active silicon region and associated interface(s). R1 is a pure resistive element while impedance, C1 (Capacitor element) is a capacitor associated imaginary component. This parallel combination is attributed to the combined silicon/LiF Interfacial Layer/solid polymer electrolyte (SPE) interfacial region(s). The combination of R1 and C adds an RC time constant to the circuit model (FIG. 4B).

The parallel combination of a resistor, R2 and constant phase element CPE2 is thought to be the electrical model of the solid polymer electrolyte interface with the interfacial additive of Cell 2 described above and the electrolyte bulk. The combination adds a second RC time constant to the circuit model to the RC model combination.

The series combination of a Warburg impedance component of the cell ($W_{s1}$) is observed with a near 45 degree "straight, diagonal" section of the Nyquist plot—illustrating great ion-diffusion properties of the electrolyte bulk and interfacial regions within the cell.

In this example, the interfacial area(s) between the crystalline silicon based electrode 10 and solid polymer electrolyte 14 has a charge transfer resistance, R1, of 85 ohms (42.9 $\Omega/cm^2$), the interfacial area and bulk regions of the solid polymer electrolyte layer 14 has a mass transport resistance, R2, of 5723 ohms (2890 $\Omega/cm^2$); where the R2/R1 illustrate a mass transfer/charge transfer resistance ratio of less than, or equal to, 68, and where the capacitance associated with the interfaces of the silicon/solid polymer electrolyte with the evaporated Lithium fluoride interfacial additive layer 12 present, is 1.21E-7 Faraday (6.11E-8 Faraday/$cm^2$) or less.

Figure 5A:
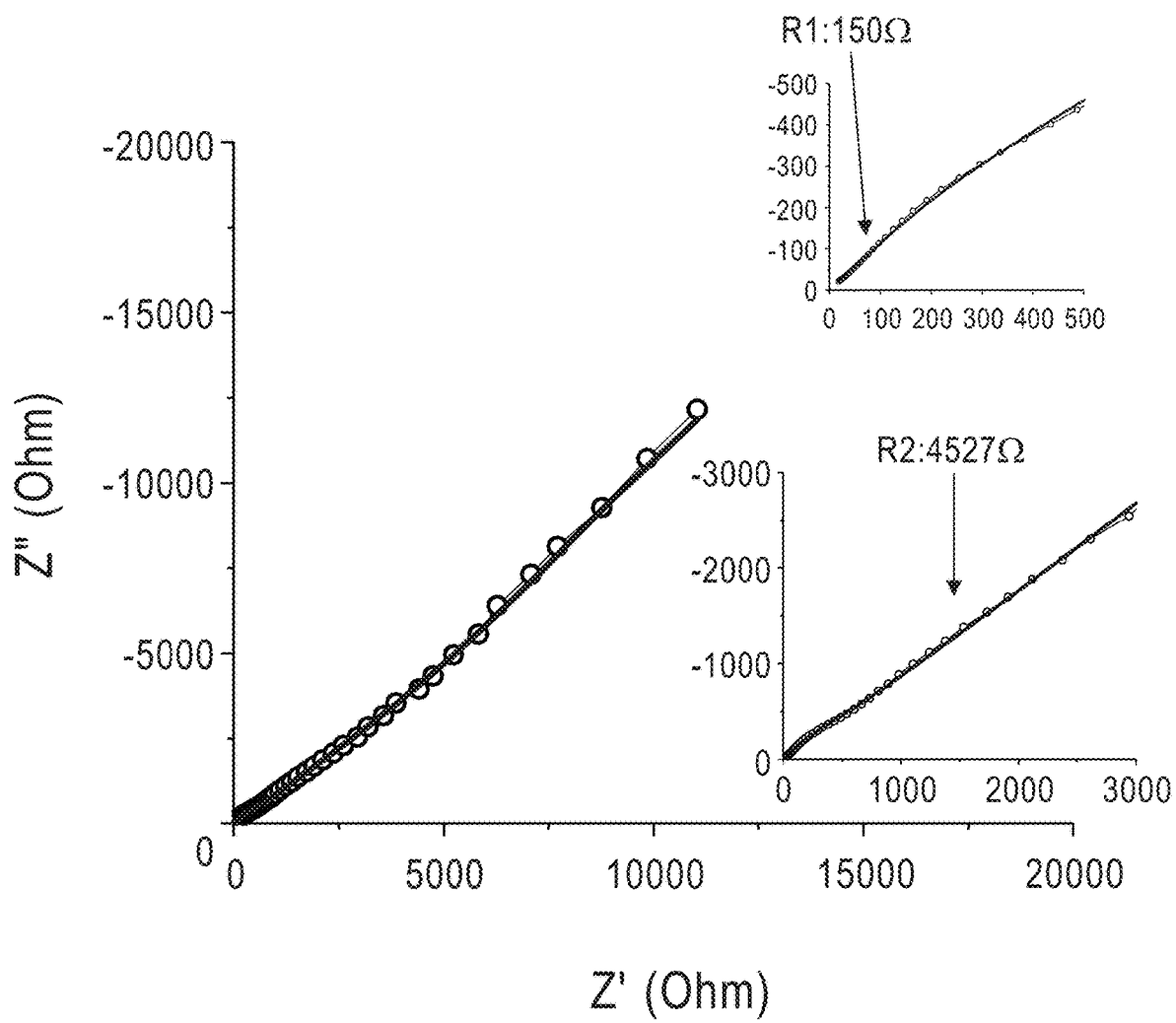
FIG. 5A is graph plotting real part of impedance, Z' in ohms (Ω) vs. imaginary part of impedance, Z" in ohms (Ω) for a device not in accordance with the present application.

The large Nyquist plot in FIG. 5A shows the impedance plots for Cell 1 described above. The "circle" points on each curve are actual measured values at a given frequency and the solid line is the calculated values from a best fit RC model, respectively. The smaller, inset Nyquist Plot in FIG. 5A highlights the high to mid frequency region of the spectrum—illustrating the mass transfer resistance of the cell (4527 $\Omega$; 2286 $\Omega/cm^2$) corresponding to the electrolyte bulk and interfacial resistance. The smallest inset Nyquist plot in FIG. 5A illustrates primarily the high frequency region of the spectrum—illustrating the charge transfer resistance of the cell (150 $\Omega$; 75.7 $\Omega/cm^2$) corresponding to the silicon bulk and interfacial resistance of the cell.

Figure 5B:
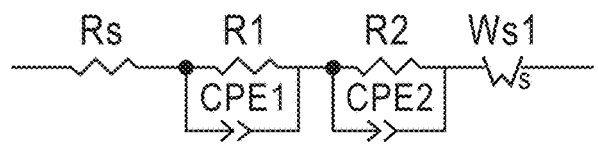
FIG. 5B is the resistor-capacitor model used to fit experimental data and obtain impedance values from the data shown in FIG. 5A.

FIG. 5B is the best fit RC model for the data points for the Cell 1. The model comprises a series or ohmic associated resistance, $R_s$; in series with a parallel combination of a resistor, R1 and constant phase element (CPE) associated impedance—where the first R/CPE parallel element is representative of the silicon/SPE (solid polymer electrolyte) interface; in series a parallel combination of a resistor, R2 and constant phase element (CPE2) associated impedance—where the second R/CPE parallel element is representative of the solid polymer electrolyte interface with the electrolyte bulk; in series with a "Warburg impedance, $W_{s_1}$.

The frequency measurements varied from 1 megahertz to 200 millihertz; utilizing an applied amplitude of 50 mV.

The parallel combination of a resistor, R1 and constant phase element (CPE) is thought to be the electrical model of the active silicon region and associated interface(s). R1 is a pure resistive element while impedance, CPE 1 (CPE, constant phase element) is a combination of both resistive and constant phase associated imaginary component. This parallel combination is attributed to the combined silicon based electrode 10/solid polymer electrolyte (SPE) 14/silicon based electrode 18 interfacial region(s) where the LiF interfacial layer is not present. The combination of R1 and CPE 1 adds an RC time constant to the circuit model (FIG. 5B).

The parallel combination of a resistor, R2 and constant phase element CPE2 is thought to be the electrical model of the solid polymer electrolyte interface with the electrolyte bulk. The combination adds a second RC time constant to the circuit model to the RC model combination.

The series combination of a Warburg impedance component of the cell ($W_{s1}$) is observed with a near 45 degree "straight, diagonal" section of the Nyquist plot—illustrating great ion-diffusion properties of the electrolyte bulk and interfacial regions within the cell.

In this same symmetric cell, where the LiF interfacial additive is not present between the silicon based electrodes 18,10 and solid polymer electrolyte layer 14, the crystalline silicon material and solid polymer electrolyte layer has a charge transfer resistance, R1, of 150 ohms (75.7 $\Omega/cm^2$), the interfacial area and bulk regions of the solid polymer electrolyte layer has a mass transport resistance, R2, of 4527 ohms (2286 $\Omega/cm^2$); where the R2/R1 illustrate a mass transfer/charge transfer resistance ratio of less than, or equal to, 31, and where the capacitance associated with the silicon/electrolyte interfaces is 1.07E-5 Faraday (5.40E-6 Faraday/$cm^2$).

The differences in the RC models (FIGS. 4B and 5B) which best fit the two symmetric cells in comparison illustrate the physio-chemical changes in the interfacial region between the silicon and solid polymer electrolyte layers. The RC model of FIG. 4B contains parallel Resistor-Capacitor (R1/C1) and Resistor-Constant phase element (R2/CPE2 elements in series. The RC model of FIG. 5B contains a Resistor-Constant phase element (R1/CPE1) and Resistor-Constant phase element (R2/CPE2) elements in series. The first parallel element in the RC model changes from Resistor-Capacitor to Resistor-Constant phase element upon eliminating the evaporation deposited LiF Interfacial layer from the symmetric cell. Hence, the change from constant phase element to capacitor element in the RC model of the symmetric cell illustrated is due to the addition of the LiF Interfacial layer as an interfacial layer between the silicon and solid polymer electrolyte (SPE) layers. Since CPE elements are often associated with chemical transition layers created upon contact, heating and/or electrochemical activity (e.g., upon applying an electrical current or potential to the cell) it can be concluded that the CPE1 element which replaces the C1 element is due to an additional interfacial layer which is grown or created when no evaporation deposited LiF Interfacial layer is present. This CPE1 represented interfacial layer is most conclusively the reason for a 65Ω (32.8 $\Omega/cm^2$) increase in the resistance to transferring charge across the silicon/SPE interface as well as a 1196Ω (604 $\Omega/cm^2$) decrease in the mass transfer resistance (ion diffusion/migration resistance) across the solid polymer electrolyte (SPE) bulk and interface regions.

From the above data, it can be observed that by inserting the interfacial additive layer between the silicon based electrode and the solid polymer electrolyte the following can be obtained: (i) a greater than 1.75× drop in charge transfer can be obtained across the silicon interface, and (ii) the relative resistance in charge transfer through the entire cell can improved through the implementation of a pre-implemented synthetic interfacial layer and consequential beneficial impedance drop of the high resistive or interfacial layers—as represented by the C1 to CPE1, RC model change of the silicon/solid polymer interface upon the addition of evaporated LiF interfacial layer.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A device comprising:
a silicon based electrode composed of a silicon-containing material having semiconductor properties, wherein the silicon-containing material is selected from the group consisting of silicon, a silicon germanium alloy and a carbon-doped silicon based alloy;
an interfacial additive layer composed of amorphous lithium fluoride formed by evaporation of a source material of lithium fluoride, wherein the interfacial additive layer has a first surface forming an interface with a surface of the silicon based electrode;
an interface region comprising a mixed composition of the silicon-containing material and the amorphous lithium fluoride present at the interface between the interfacial additive layer and the surface of the silicon based electrode; and
a solid polymer electrolyte layer forming an interface with a second surface of the interfacial additive layer that is opposite the first surface of the interfacial additive layer.

2. The device of claim 1, wherein the silicon based electrode is composed of silicon, and the silicon is selected from the group consisting of non-porous silicon, partially porous crystalline silicon, single-crystal non-porous silicon, crystalline silicon, a low resistance doped crystalline silicon, boron doped crystalline silicon and boron doped crystalline porous silicon.

3. The device of claim 1, wherein the solid polymer electrolyte layer is composed of a mixture of a polymer structure host material, a Li-conductive/plasticizing material and a lithium containing salt.

4. The device of claim 3, wherein the polymer structure host material is composed of at least one of poly(ethylene oxide) (PEO), poly(propylene oxide) (PPO), poly(dimethylsiloxane), poly(vinyl chloride), or polycaprolactone.

5. The device of claim 3, wherein the Li-conductive/plasticizing material comprises at least one of succinonitrile, poly(ethylene glycol) (PEG), an aprotic organic solvent, or dimethylsulfoxide (DMSO).

6. The device of claim 3, wherein the lithium containing salt is composed of at least one of lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl)imide (LiTFSI), lithium difluoro(oxalato)borate (LiDFOB), or lithium bis(oxalato)borate(LiBOB).

7. The device of claim 1, wherein the solid polymer electrolyte layer comprises a lower region and an upper region, and wherein a separator is present between the lower region and the upper region.

8. The device of claim 7, wherein the separator is composed of at least one of polyacrylnitrile (PAN), polyethylene oxide (PEO) based copolymer matrices or structural membranes, a quarternized polysulfone membrane, electrospun polyvinylidene fluoride, or a methylmethacrylate (MMA)/polyethylene (PE) composite.

9. The device of claim 1, wherein the solid polymer electrolyte layer is composed of a garnet/polymer electrolyte composite.

10. The device of claim 1, further comprising a counter electrode located above the solid polymer electrolyte layer.

11. The device of claim 10, wherein the counter electrode is a second silicon based electrode composed of a second silicon-containing material having semiconductor properties, wherein the second silicon-containing material is selected from the group consisting of silicon, a silicon germanium alloy and a carbon-doped silicon based alloy, and wherein a second interfacial additive layer composed of amorphous lithium fluoride formed by evaporation of a source material of lithium fluoride is present directly between the solid polymer electrolyte layer and the second silicon based electrode.

12. The device of claim 11, wherein the silicon based electrode is composed of silicon, and the silicon is selected from the group consisting of non-porous silicon, partially porous crystalline silicon, single-crystal non-porous silicon, crystalline silicon, a low resistance doped crystalline silicon, boron doped crystalline silicon and boron doped crystalline porous silicon.

13. The device of claim 1, wherein an interfacial area between the silicon based electrode and the interfacial additive layer has a charge resistance of 43 ohms/cm$^2$, the interfacial area and bulk regions of the solid polymer electrolyte layer has a mass transport resistance of less than 2895 ohms/cm$^2$, and wherein a mass transfer/charge transfer resistance ratio is less than, or equal to, 68.

14. A device comprising:
a silicon based electrode composed of boron doped crystalline silicon;
an interfacial additive layer composed of amorphous lithium fluoride formed by evaporation of a source material of lithium fluoride, wherein the interfacial additive layer has a first surface forming an interface with a surface of the silicon based electrode;
an interface region comprising a mixed composition of the boron doped crystalline silicon and the amorphous lithium fluoride present at the interface between the interfacial additive layer and the surface of the silicon based electrode; and
a solid polymer electrolyte layer composed of a mixture of polycaprolactone, succinonitrile and lithium bis(trifluoromethanesulfonyl)imide (LiTFSI) forming an interface with a second surface of the interfacial additive layer that is opposite the first surface of the interfacial additive layer.

15. The device of claim 14, further comprising a second interfacial additive layer composed of amorphous lithium fluoride formed by evaporation of a source material of lithium fluoride forming an interface with the solid polymer electrolyte layer, and a second silicon based electrode composed of boron doped crystalline silicon forming an interface with the second interfacial additive layer.

16. The device of claim 14, wherein an interfacial area between the silicon based electrode and the interfacial additive layer has a charge resistance of 43 ohms/cm$^2$, the interfacial area and bulk regions of the solid polymer electrolyte layer has a mass transport resistance of less than 2895 ohms/cm$^2$, and wherein a mass transfer/charge transfer resistance ratio is less than, or equal to, 68.

17. A method of forming a device, the method comprising:
depositing an amorphous lithium fluoride film by evaporation of a lithium fluoride source material on a surface of a silicon based electrode to provide an interfacial additive layer composed of the amorphous lithium fluoride film, wherein the silicon based electrode is composed of a silicon-containing material having semiconductor properties, and wherein the silicon-containing material is selected from the group consisting of silicon, a silicon germanium alloy and a carbon-doped silicon based alloy; and
forming a solid polymer electrolyte layer on the interfacial additive layer.

18. The method of claim 17, further comprising depositing by evaporation lithium fluoride on a surface of a solid polymer electrolyte layer to provide a second interfacial additive layer composed of amorphous lithium fluoride, and forming a counter electrode on the second interfacial additive layer.

19. The method of claim 18 wherein the counter electrode is a lithium transition metal oxide type electrode.

20. The method of claim 17, further comprising forming a counter electrode above the solid polymer electrolyte layer, wherein the counter electrode is a lithium intercalation- type cathode material.

* * * * *